(12) United States Patent
Curry et al.

(10) Patent No.: US 7,233,695 B2
(45) Date of Patent: Jun. 19, 2007

(54) SCAN COLOR CONVERSION METHOD

(75) Inventors: Donald J. Curry, Menlo Park, CA (US); Doron Kletter, San Mateo, CA (US); Asghar Nafarieh, Menlo Park, CA (US)

(73) Assignee: Xerox Corporation, Stamford, CT (US)

( * ) Notice: Subject to any disclaimer, the term of this patent is extended or adjusted under 35 U.S.C. 154(b) by 885 days.

(21) Appl. No.: 10/612,261

(22) Filed: Jul. 1, 2003

(65) Prior Publication Data

US 2004/0056835 A1 Mar. 25, 2004

Related U.S. Application Data

(60) Provisional application No. 60/393,244, filed on Jul. 1, 2002.

(51) Int. Cl.
  G06K 9/00 (2006.01)
  G09G 5/00 (2006.01)
  H04N 1/46 (2006.01)

(52) U.S. Cl. .................. 382/162; 382/167; 345/606; 358/525

(58) Field of Classification Search ............... 382/162, 382/166, 167; 345/606–610; 358/525
See application file for complete search history.

(56) References Cited

U.S. PATENT DOCUMENTS

| | | |
|---|---|---|
| 4,849,914 A | 7/1989 | Medioni et al. |
| 5,515,452 A | 5/1996 | Penkethman et al. |
| 5,583,659 A | 12/1996 | Lee et al. |
| 5,644,509 A * | 7/1997 | Schwartz .................. 358/518 |
| 5,745,596 A | 4/1998 | Jefferson |

(Continued)

FOREIGN PATENT DOCUMENTS

EP   0 712 094 A2   5/1996

(Continued)

OTHER PUBLICATIONS

U.S. Appl. No. 10/187,499, filed Jul. 2002, Curry et al.

(Continued)

*Primary Examiner*—Jingge Wu
*Assistant Examiner*—Yubin Hung
(74) *Attorney, Agent, or Firm*—Oliff & Berridge, PLC

(57) ABSTRACT

A method and a system for computing the function value of an input node based on function values of known nodes. A database of known nodes and their corresponding function values is formed. The known nodes are located such that a distance between any two adjacent known nodes is an integer power-of-two number. The database is searched for a first node such that the input node is located between the first node and an adjacent second node. The difference δ between the input node and the first node is computed. Then δ is shifted to the right by k positions, k being the logarithm in base 2 of the distance between the first and second nodes. The input node function value is computed by combining the first node function value with the product of the shifted δ and the difference between the function values of the second and first nodes. When used in MRC context, the above method and system is applied to each of the color MRC planes individually, instead of the merged output. The resulting performance is approved since most if not all of the color MRC planes are sub-sampled.

16 Claims, 17 Drawing Sheets

U.S. PATENT DOCUMENTS

| | | | |
|---|---|---|---|
| 5,809,181 A * | 9/1998 | Metcalfe | 382/276 |
| 5,900,953 A | 5/1999 | Bottou et al. | |
| 6,058,214 A | 5/2000 | Bottou et al. | |
| 6,118,549 A * | 9/2000 | Katougi et al. | 358/1.9 |
| 6,324,305 B1 | 11/2001 | Holladay et al. | |
| 6,343,154 B1 | 1/2002 | Bottou et al. | |
| 6,400,844 B1 | 6/2002 | Fan et al. | |
| 6,633,670 B1 | 10/2003 | Matthews | |
| 6,674,435 B1 * | 1/2004 | Payne et al. | 345/442 |
| 6,825,958 B1 * | 11/2004 | Fukasawa et al. | 358/523 |
| 6,975,331 B2 * | 12/2005 | Kletter | 345/604 |

FOREIGN PATENT DOCUMENTS

| | | |
|---|---|---|
| EP | 1 006 716 A2 | 6/2000 |

OTHER PUBLICATIONS

U.S. Appl. No. 10/188,026, filed Jul. 2002, Curry et al.
U.S. Appl. No. 10/188,157, filed Jul. 2002, Curry et al.
U.S. Appl. No. 10/188,249, filed Jul. 2002, Curry et al.
U.S. Appl. No. 10/188,277, filed Jul. 2002, Curry et al.
U.S. Appl. No. 10/612,057, filed Jul. 2003, Curry et al.
U.S. Appl. No. 10/612,062, filed Jul. 2003, Curry et al.
U.S. Appl. No. 10/612,063, filed Jul. 2003, Curry et al.
U.S. Appl. No. 10/612,064, filed Jul. 2003, Curry et al.
U.S. Appl. No. 10/612,084, filed Jul. 2003, Curry et al.
U.S. Appl. No. 10/612,234, filed Jul. 2003, Curry et al.
U.S. Appl. No. 10/612,246, filed Jul. 2003, Curry et al.
U.S. Appl. No. 10/612,248, filed Jul. 2003, Curry et al.
U.S. Appl. No. 10/612,250, filed Jul. 2003, Curry et al.
U.S. Appl. No. 10/612,368, filed Jul. 2003, Curry et al.
U.S. Appl. No. 10/612,461, filed Jul. 2003, Curry et al.
R. De Queiroz, "Compression of Compound Documents," *IEEE*, 1999.
U.S. Appl. No. 10/776,515, filed Feb. 12, 2004, Curry et al.
U.S. Appl. No. 10/776,514, filed Feb. 12, 2004, Curry et al.
U.S. Appl. No. 10/776,608, filed Feb. 12, 2004, Curry et al.
U.S. Appl. No. 10/776,602, filed Feb. 12, 2004, Curry et al.
U.S. Appl. No. 10/776,620, filed Feb. 12, 2004, Curry et al.
U.S. Appl. No. 10/776,603, filed Feb. 12, 2004, Curry et al.
U.S. Appl. No. 10/776,509, filed Feb. 12, 2004, Claassen et al.
U.S. Appl. No. 10/776,508, filed Feb. 12, 2004, Curry et al.
U.S. Appl. No. 10/776,516, filed Feb. 12, 2004, Curry et al.
U.S. Appl. No. 10/776,612, filed Feb. 12, 2004, Curry et al.

* cited by examiner

FIG. 2
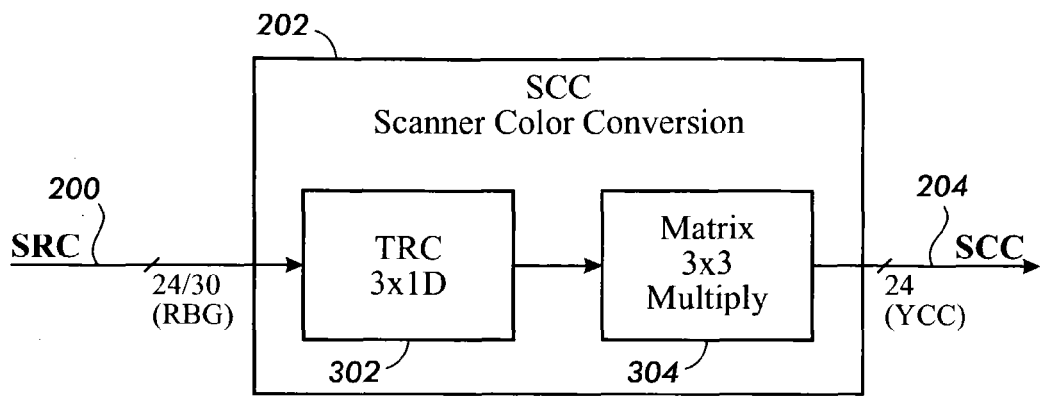
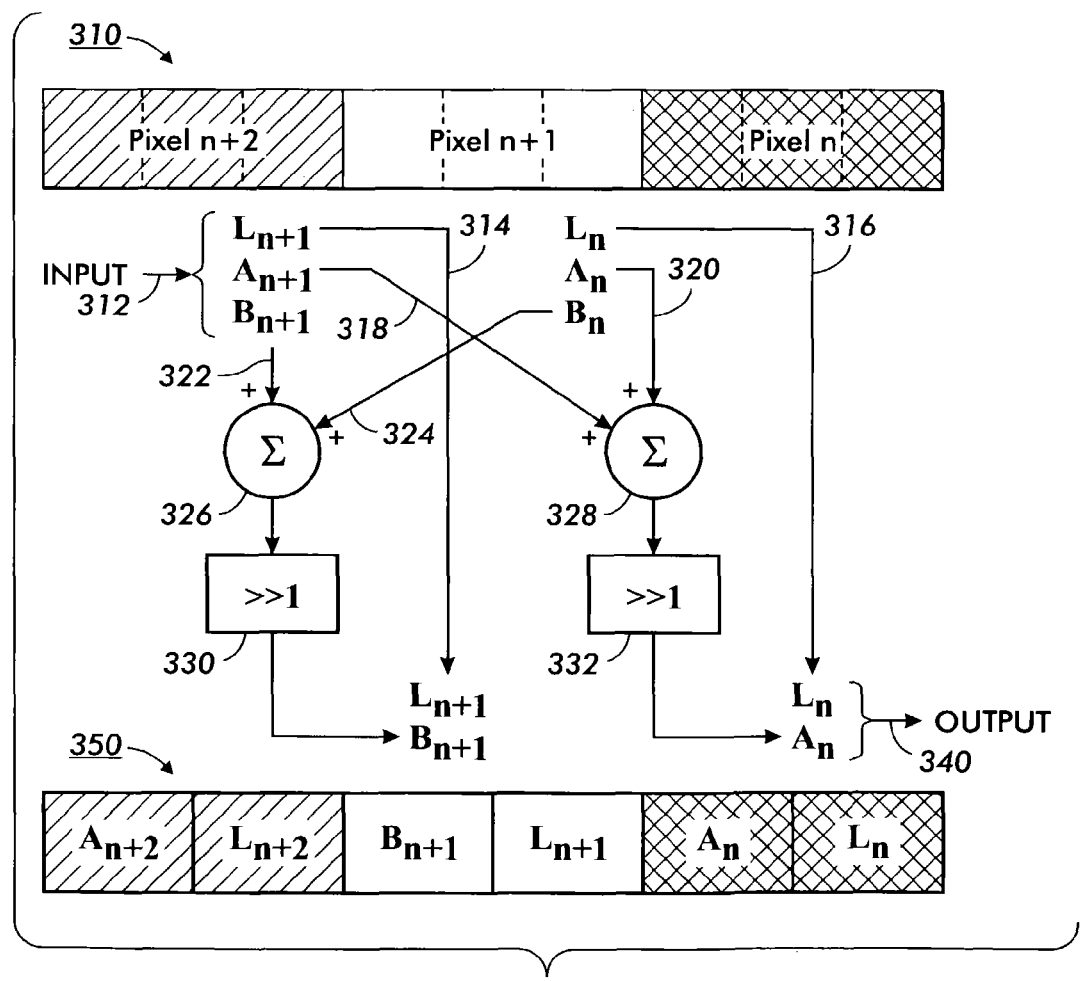
FIG. 3

| Variable | Initialized to | Meaning | Usage |
|---|---|---|---|
| SclSrc_Sft | 13 | Fixed (3.13) | Constant |
| StpSrc_X | (1<<SclSrc_Sft)/scale_X | ΔX | X_Src_step |
| StpSrc_Y | (1<<SclSrc_Sft)/scale_Y | ΔY | Y_Src_step |
| Mask | (1<<SclSrc_Sft) – 1 | 1.0 – ε(1 LSB) | AND to obtain fraction |
| Half | (1<<SclSrc_Sft)>>1 | 0.5 | may be added for rounding |

| nodeIndex | nodeValue | EXPONENT |
|---|---|---|
| 0 | 0* | 2 |
| 1 | 4 | 2 |
| 2 | 8 | 3 |
| 3 | 16 | 4 |
| 4 | 32 | 4 |
| 5 | 48 | 4 |
| 6 | 64 | 4 |
| 7 | 80 | 4 |
| 8 | 96 | 4 |
| 9 | 112 | 4 |
| 10 | 128 | 4 |
| 11 | 144 | 4 |
| 12 | 160 | 4 |
| 13 | 176 | 4 |
| 14 | 192 | 5 |
| 15 | 224 | 5 |
| 16 | 255 | |

760

770

| nodeIndex | nodeValue | EXPONENT |
|---|---|---|
| 0 | 0* | 4 |
| 1 | 16 | 4 |
| 2 | 32 | 5 |
| 3 | 64 | 6 |
| 4 | 128 | 6 |
| 5 | 192 | 6 |
| 6 | 256 | 6 |
| 7 | 320 | 6 |
| 8 | 384 | 6 |
| 9 | 448 | 6 |
| 10 | 512 | 6 |
| 11 | 576 | 6 |
| 12 | 640 | 6 |
| 13 | 704 | 6 |
| 14 | 768 | 7 |
| 15 | 896 | 7 |
| 16 | 1023 | |

*FIG. 17*

| nodeIndex | nodeValue | EXPONENT |
|---|---|---|
| 0 | 0 | 5 |
| 1 | 32 | 5 |
| 2 | 64 | 4 |
| 3 | 80 | 4 |
| 4 | 96 | 4 |
| 5 | 112 | 3 |
| 6 | 120 | 2 |
| 7 | 124 | 2 |
| 8 | 128* | 2 |
| 9 | 132 | 2 |
| 10 | 136 | 3 |
| 11 | 144 | 4 |
| 12 | 160 | 4 |
| 13 | 176 | 4 |
| 14 | 192 | 5 |
| 15 | 224 | 5 |
| 16 | 255 | |

780

(Origin at 128 for a* and b*)

FIG. 19

| nodeIndex | nodeValue | EXPONENT |
|---|---|---|
| 0 | 0 | 5 |
| 1 | 32 | 4 |
| 2 | 48 | 4 |
| 3 | 64 | 4 |
| 4 | 80 | 3 |
| 5 | 88 | 2 |
| 6 | 92 | 2 |
| 7 | 96* | 2 |
| 8 | 100 | 2 |
| 9 | 104 | 3 |
| 10 | 112 | 4 |
| 11 | 128 | 4 |
| 12 | 144 | 5 |
| 13 | 176 | 5 |
| 14 | 192 | 5 |
| 15 | 224 | 5 |
| 16 | 255 | |

790

(Origin at 96 for Fax b*)

SCAN COLOR CONVERSION METHOD

This application is based on a Provisional Patent Application No. 60/393,244 filed Jul. 1, 2002.

CROSS-REFERENCE TO RELATED APPLICATIONS

The present application is related to the following co-pending applications: Ser. No. 10/187,499 entitled "Digital De-Screening of Documents", Ser. No. 10/188,026 entitled "Control System for Digital De-Screening of Documents", Ser. No. 10/188,277 entitled "Dynamic Threshold System for Multiple Raster Content (MRC) Representation of Documents", Ser. No. 10/188,157 entitled "Separation System for Multiple Raster Content (MRC) Representation of Documents", and Ser. No. 60/393,244 entitled "Segmentation Technique for Multiple Raster Content (MRC) TIFF and PDF all filed on Jul. 01, 2002 and all commonly assigned to the present assignee, the contents of which are herein incorporated by reference.

BACKGROUND

Documents scanned at high resolutions require very large amounts of storage space. Furthermore, large volume of image data requires substantially more time and bandwidth to move around, or over networks. Instead of being stored in raw scanned RGB format, the data is typically subjected to some form of data compression in order to reduce its volume, and thereby avoid the high costs of storage it. "Lossless" compression methods such as Lempel-Ziv (LZ) do not perform particularly well on scanned (noisy) pixel data. While "lossy" methods such as JPEG work fairly well on continuous-tone pixel maps, they do not work particularly well on the parts of the page containing text and line art. To optimize image data compression, techniques, which can recognize the type of data being compressed, are needed.

One approach to satisfy the compression needs of differing types of data has been to use an encoder pipeline utilizing a Mixed Raster Content (MRC) format to describe the image. The image—a composite image having text intermingled with color or gray scale information—is segmented into two or more planes, generally referred to as the upper and lower plane, and a selector plane is generated to indicate, for each pixel, which of the image planes contains the actual image data that should be used to reconstruct the final output image. Segmenting the planes in this manner can improve the compression of the image because the data can be arranged such that the planes are smoother and more compressible than the original image. Segmentation also allows different compression methods to be applied to the different planes. Thus, the most compression technique for the type of the data in each plane can be applied.

SUMMARY OF THE INVENTION

A method and a system for computing the function value of an input node based on function values of known nodes. A database of known nodes and their corresponding function values is formed. The known nodes are located such that a distance between any two adjacent known nodes is an integer power-of-two number. The database is searched for a first node such that the input node is located between the first node and an adjacent second node. The difference $\delta$ between the input node and the first node is computed. Then $\delta$ is shifted to the right by k positions, k being the logarithm in base 2 of the distance between the first and second nodes. The input node function value is computed by combining the first node function value with the product of the shifted $\delta$ and the difference between the function values of the second and first nodes. When used in MRC context, the above method and system is applied to each of the color MRC planes individually, instead of the merged output. The resulting performance is approved since most if not all of the color MRC planes are sub-sampled.

BRIEF DESCRIPTION OF THE DRAWINGS

The features and advantages of the present invention will become apparent from the following detailed description of the present invention in which:

FIG. 2 shows a detailed block diagram of the Scan Color Conversion Module SCC.

FIG. 3 illustrates applying 2× sub-sampling in a fast scan direction.

FIG. 7 a table showing 16 bit variables used in the Scale Module.

FIG. 16 shows a table for values used in 2 node spacing technique.

FIG. 17 shows a table for values of 10-bit instead of 8-bit inputs.

FIG. 19 shows a table having example values at 128 for the LUT.

DETAILED DESCRIPTION OF THE INVENTION

A new system is described for automatically processing scanned and/or printed color documents and producing small, highly compressed files that accurately capture the original document content. The system, also know as an encoder or front end, includes all the necessary processing elements that are needed to ensure high compression and high image quality. Output files are generated in accordance with the newly emerging standard of MRC (Mixed Raster Content) representation, now included in both TIFF and PDF, as well as PostScript. The core of the system is composed of a descreener that preconditions the documents by removing the original screens, followed by a segmentor to segment the incoming data into [three or four] planes: Background, Foreground, Selector, and optional Hint planes.

Figure 1:
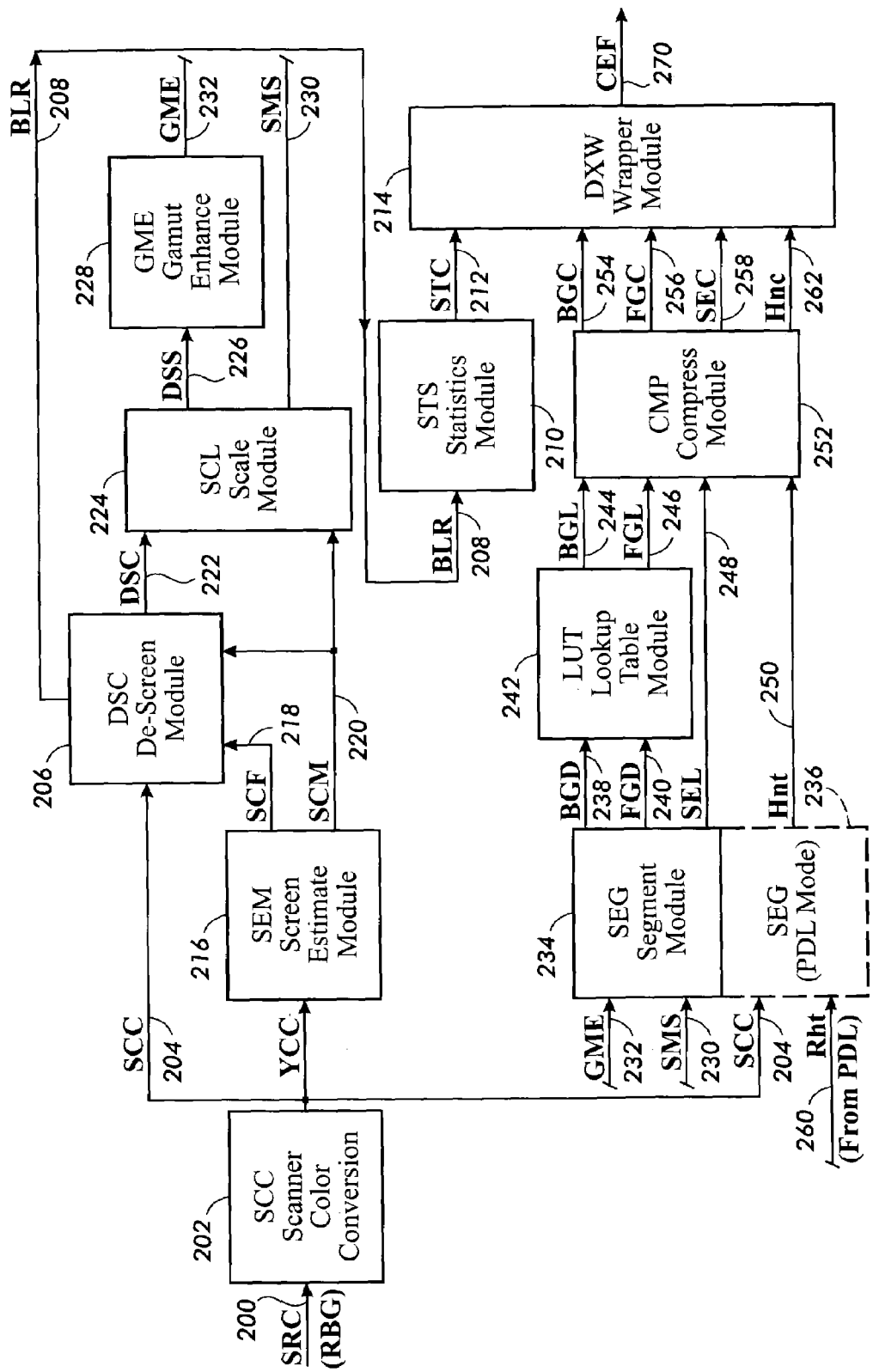
FIG. 1 shows a block diagram of an encode pipeline for using Mixed Raster Content images.

Referring now to FIG. 1, a block diagram of an encoder for use with the present invention is shown. The encoder pipeline accepts RGB data from the scanner input SRC 200 on the top left. The Scanner Color Conversion (SCC) Module 202 converts the input data from RGB into a YCC color space, which is more convenient for de-screening and segmentation. The module SCC 202 uses three 1D TRC lookup tables followed by a 3×3 matrix multiply unit.

The Scanner Color Conversion 202 is performed in two separate steps. First, the incoming source signal SRC from the scanner (usually in RGB color space) is converted to an intermediate linear xYCC color space. In this context xYCC represents a color space that is similar to the standard sYCC, except it is a linear color space, that is no gamma function is applied as in sYCC. In the second step, the xYCC color space will be converted to ICC-Lab just prior to compression as will be more fully described below. The encoder pipeline supports the following two possible choices for CEF MRC color space representation:

1) ICC-Lab is used for scanned documents (Scan configuration), and
2) xYCC is used for synthetic (noise-free) data (PDL configuration)

The reason for the limited choice of color spaces is that the color space must satisfy many constraints: (a) first and foremost, it must be a standard device-independent format that is commonly understood by a broad range of products; (b) The TIFF specification, which is what front-end encoder may emit, supports only the Lab format for now whereas sYCC is currently under consideration to be added, in contrast PDF supports additional choices such as RGB in addition LAB; (c) It is desirable to have a color space with luminance—chrominance representation to leverage the properties of the Human Visual System for added compression; and (d) The color space should be convenient for processing and manipulation, as well as provide users with easy ways to manipulate and/or adjust the colors.

The use of ICC-Lab color space has multiple advantages: (1) it is a standard color space that is supported by nearly all operating systems and applications; (2) it is device independent; (3) it separates color data into luminance and chrominance components which are convenient for handling and compression; and (4) it is modeled after the Human Visual System and normalized such that a vector length of one unit anywhere in the visible color space has about the same color weight (as measured empirically).

For these reasons the encoder has adapted the use of ICC-Lab for the pipeline (though other color spaces can be used). The Front-End (Encode) and Back-End (Decode) pipelines have established the following guidelines with respect to the internal color space representation:

1) Scan configuration: Unless otherwise noted, the internal xYCC representation (including the CEF Lab) assumes that the chroma is sub-sampled by a factor of 2× in the fast-scan direction only. The pipeline does not sub-sample the chroma in the slow scan direction due to the additional complexity and storage requirements, even though it may slightly increase the compression. If the source image has an odd number of pixels along scan lines, the last image column is replicated to make the number of pixels even.

2) PDL configuration: Since the internal YCC represent accurate and noise-free PDL data, no sub-sampling of the color space is performed in either direction.

The pipeline internally maintains color information in a luminance chrominance color space such as YCbCr or LAB. It should be noted that although the LAB color space component names are referred to the SCC outputs and most of the scan path actually use the YCbCr color space rather than LAB.

Unless otherwise noted, the chrominance components of image data are sub-sampled by a factor of two in the fast scan direction (XCSS) thereby referred to as X chroma sub-sampling. The Color Conversion Module SCC 202 is the first module to generate the XCSS sub-sampled data. The sub-sampling technique uses (A, B) data from two neighboring pixels averaged together prior to performing the sub-sampling. When the data is to be reconstructed, the averaged (A, B) value is duplicated for two subsequent pixels.

The detailed block diagram of the Scan Color Conversion Module SCC 202 is shown in FIG. 2. The configuration of the Scan Color Conversion Module 202 contains three 1D TRC tables 302 followed by a 3×3 Matrix Multiply Unit 304. The Scan Color Conversion Module SCC 202 takes as input the source RGB signal 200 from the scanner or PDL source. The incoming scanner RGB data 200 can be 8 or 10-bit deep per component. The scanner data is unlikely to be packed, so each RGB component will take 2-bytes. In terms of input bandwidth, the scanner data will consume twice as much bandwidth to read in relative to the PDL data.

The input to the Scan Color Conversion Module SCC 202 is a full color 8-bit or 10-bit unpacked RGB data 200. In the case of 8-bit input data, the source signal will exactly fill 3 bytes of RGB data. However, in the case of 10-bit input data, the three 10-bit RGB quantities will be packed into 32-bit double word, taking 4 bytes per 10-bit RGB pixel.

The output SCC 204 from the Scan Color Conversion Module SCC 202 can assume one of two forms: under normal Scan or PDL operation, a stream of sub-sampled alternating (Y, Cb, Y, Cr) will be produced with each YCx pair as one 16-bit word (two bytes) per pixel. The second form is for the special high quality PDL mode, in which case the chroma is not sub-sampled, and the (Y, Cb, Cr) data requires 3 bytes per pixel. Either way, the 24-bit notation shown in FIG. 2 indicates that the output SCC 204 is a full-color signal. It should be noted that the indicated number of bits does not necessarily represents the actual number of bits due to packing and/or sub-sampling.

The 1D TRC table unit 302 contains three independent 1D lookup tables (not shown). Each table has a 10-bit to 8-bit mapping, and therefore has up to 1024 entries of one byte each. The TRC (Tone Reproduction Curve) tables may be created and used to arbitrarily map the input to the output. Some of the more useful mappings include the application of dynamic stretch, gamma curves, and companding. In addition, TRC tables are utilized to implement the user controls such as adjusting the scanner color or darkness/lightness.

The Matrix Multiply Unit 304 implements a 3×3 matrix multiply according to the following equation:

$$\begin{bmatrix} Y \\ Cb \\ Cr \end{bmatrix} = \frac{1}{M} \left( \begin{bmatrix} A_{11} & A_{12} & A_{13} \\ A_{21} & A_{22} & A_{23} \\ A_{31} & A_{32} & A_{33} \end{bmatrix} \begin{bmatrix} R \\ G \\ B \end{bmatrix} + \begin{bmatrix} Y\_Bias \\ Cb\_Bias \\ Cr\_Bias \end{bmatrix} \right) \quad (1)$$

where the input RGB values are unsigned 8 bits and matrix coefficients $\{A_{mn}\}$ are 12-bit signed quantities to be multiplied, and M is the normalization factor M=2^SCC_Mat_Shift. The matrix multiply requires as a minimum at least 20-bits of intermediate accumulated precision.

After matrix multiplication and a rounding right shift, the resulting signed (Y, Cb, Cr) quantities are converted to the normal unsigned YCbCr coding by clamping all 3 values between 0 and 255. Note that in general matrix conversion, the input data may need to be adjusted from encoded unsigned to signed quantities before multiplication. For example, in the YCC to RGB matrix conversion, (0, −128, −128) must be added to the (Y, C, C) quantities before multiplication.

FIG. 3 illustrates the application of the 2× sub-sampling in the fast scan direction XCSS. The operation is performed on two pixels at a time. After the scanner color conversion is applied to the input RGB data 200, a (L, A, B) triplet is produced for each converted pixel as a sequence on a raster scan. The sub-sampling of the chroma by 2× in the fast scan direction is accomplished by independently averaging the pairs of chroma values $(A_n, A_{n+1})$ and $(B_n, B_{n+1})$ of subsequent pixels.

The upper most strip 310 in FIG. 3 represents the "stream" of converted pixels from the color conversion unit. Each pixel, pattern filled to represent a different color, contains a triplet of output values for the (L, A, B) values, represented as 8-bit each. The boundaries between pixels mark the pairing of subsequent pixels together for the sub-sampling.

The bottom strip 350 in FIG. 3 represents the "stream" of output pixels after chroma sub-sampling. The "stream" is composed of a sequence of alternating pairs of (L, A) and (L, B) values, where the L's correspond to the original sequence of 'L' values, and the alternating (A, B)'s are the averaged quantities of the pixel pair. The 'A' value of a pair of pixels always precedes the 'B' value. The mapping from the original (L, A, B) triplets to the (L, A, L, B) format is shown in the center part of FIG. 3.

The main advantage of the internal sub-sampling scheme is the 3 to 2 reduction in bandwidth and storage memory. Assuming 8-bit quantities for the internal (L, A, B) data, the original data requires 3 bytes per pixel, while the sub-sampled output only uses 2 bytes per pixel. Furthermore, the sub-sampling method leverages the properties of the Human Visual System in that it is permissible to sub-sample the chroma channels (A, B) without significant quality loss. Although further gain may be possible by also sub-sampling the chroma in the slow scan direction, this operation requires storage of the previous line of pixels and is therefore more costly to implement. Therefore, it is decided not to use slow-scan sub-sampling for the internal LAB representation.

Figure 4:
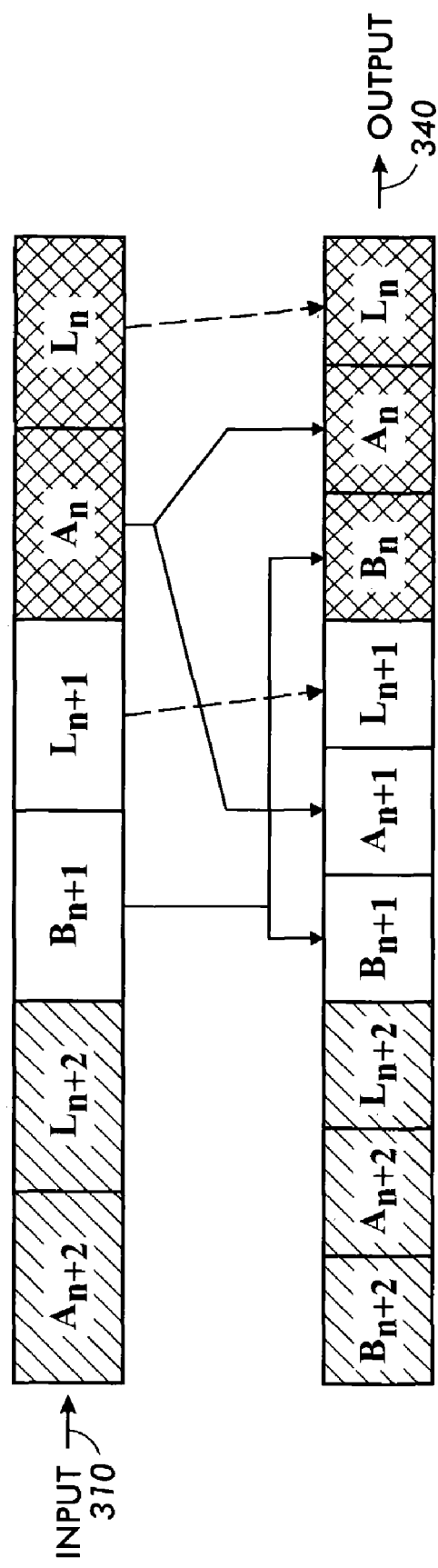
FIG. 4 illustrates the method of reconstruction of the original (non sub-sampled) pixels from the sub-sampled data.

Similarly, FIG. 4 illustrates the method of reconstruction of the original (non sub-sampled) pixels from the sub-sampled data. The implementation of the method is straightforward. The averaged (A, B) chroma values from a pair of pixels are duplicated and used with each of the reconstructed pixels. The 'L' values are not changed.

Referring once again to FIG. 1, the SCC output 204 is delivered to the Screen Estimate Module (SEM) 216 and the De-Screen Module (DSC) 206. In addition, the encode pipeline can handle synthetic (noise-free) input images such as PDL images that are produced during printing. In this special PDL mode 236, the de-screen unit is bypassed, and the SCC output 204 is directly forwarded to the PDL Segment Module (SEG) 236, which operates in the special segmentation mode.

The Screen Estimate Module (SEM) 216 estimates the halftone screen frequency and magnitude, which are subsequently used by the De-Screen (DSC) 206 and SCL Scale 224 Modules. The SEM Module 216 operates on the luminance channel Y of the input scanner data, obtained after conversion from RGB to YCC in the SCC 202 Module. The SEM 216 Module uses one or more independent channels with different sensitivities (e.g., Max, High, and Low). The most sensitive channel derives the frequency estimate, and the two other less-sensitive channels are combined to create the screen magnitude. The Screen Estimate Module 216 provides two [single-component] outputs: the screen frequency estimate Scf 218 and screen magnitude estimate Scm 220, which are used by the De-Screen (DSC) 206 and SCL Scale 224 Modules. The screen magnitude can be interpreted as the confidence level that local area near the pixel of interest is a halftone screen. The Screen Estimate Module 216 is bypassed for synthetic (noise free) input.

The purpose of the De-Screen (DSC) 206 Module is to selectively eliminate the halftone screens from the scanned input signal, while preserving or enhancing the sharp edge information of text or line art objects. The De-Screen Module 206 operates on the converted YCC image that was produced by the Scan Color Conversion (SCC) 202 Module. The module uses the estimated screen frequency Scf 218 and magnitude Scm 220 signals from the Screen Estimate Module 216 (SEM). The method of de-screening is based on a dynamically controlled filter bank, providing variable blending among multiple filtered outputs. The module also includes independent continuous control of post-blur sharpening using a variable un-sharp masking mechanism, and provides the capability to adjust the neutrality of pixels at the output. The De-Screen Module 206 produces the de-screened output signal DSC 222, and, in addition, the module 206 also produces the blurred version of the input signal BLR 208 used by the Statistics Module (STS) 210.

The Scale Module (SCL) 224 scales the incoming data by arbitrary amounts in either dimension. The method of scaling is 2D bi-linear interpolation. The module 224 relies on the de-screen module 206 to perform any necessary pre-filtering (e.g., for reduction). The encode pipeline uses two instances of the Scale Module SCL 224. In one instance, the de-screener output DSC 206 is scaled to produce the output DSS 226; in the second instance, the Scm 220 signal from the Screen Estimate Module 216 is scaled to produce the output SMS 230. The Scaled De-screener output DSS 226 is enhanced by the Gamut Enhance Module GME 228. The resulting GME 232 output as well as the SMS 230 are forwarded to the Segment Module (SEG) 234; It should be noted that DSS 226 is a full color (3-component) signal, while SMS 230 is only monochrome (single component).

Figure 5:
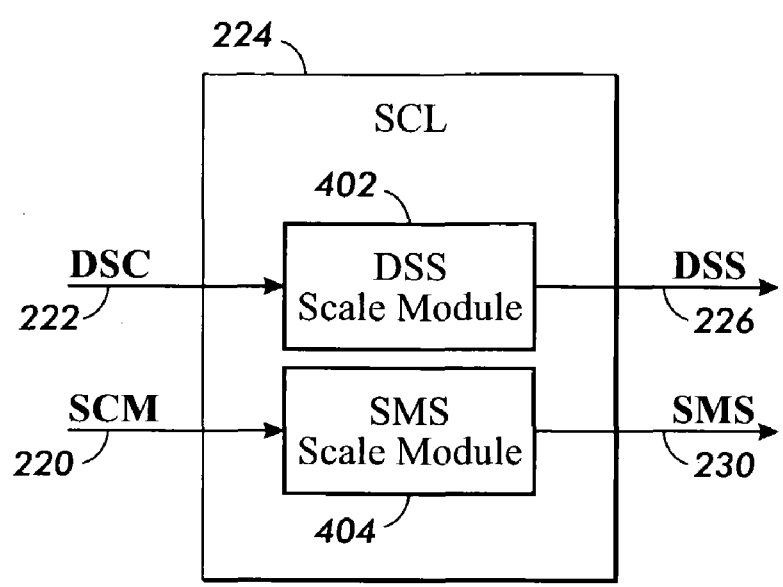
FIG. 5 shows a detailed block diagram of the Scale Module.

FIG. 5 shows a detailed block diagram of the Scale Module. The Scale Module 224 is responsible for scaling one or more input color images to produce scaled color images at the output. Each image is independently scaled. The method of scaling is bilinear interpolation without pre-filtering, since the Scale Module 224 relies on the preceding modules to provide the necessary amount of pre-filtering. The Scale Module 224 can independently scale the source images by different amounts in the fast and slow scan directions (anamorphic scaling). In general, due to bandwidth considerations, the scaling in each direction is limited to the range of 4× reduction (25%) to 4× enlargement (400%), in 1% increments or so.

In a front-end image path, two instances of the Scale Module 224 are independently used. The first scale module 402 is used to scale the de-screened color image DSC 222 before segmentation. The result is the scaled color image output DSS 226. In addition, a second scale module 404 is used to scale the monochrome screen magnitude signal SCM 220 to produce the scaled version SMS 230, which is needed for the segmentation operation. It should be noted that both scale modules, 402 and 404 respectively apply the same amount of scaling on their respective source images.

In the front-end pipeline, it is anticipated that the two scaling units are mainly used for reduction. The reason is that by scaling down the color foreground and background data, the size of the CEF is minimized. Likewise, in the case of enlargement, it would make sense to enlarge the data at the back-end, thereby again minimizing the compressed CEF size. Therefore it is not anticipated that any of the front-end scaling units would actually be used for enlargement. However, there may be some situations (such as for scan to export) where it would be desired to enlarge the image in the front-end. The two scaling modules could also be utilized for that purpose, should that be necessary.

The input to the first Scale Module 402 is the full color (L, A, B) source signal DSC 222, with the chroma (A, B) signals generally sub-sampled by a factor of 2× in the fast scan direction only (relative to the luminance channel). The output of the first Scale Module DSS 226 is a scaled (smaller or larger) version of the input source signal DSC 222. The format of the output signal is similar to the input, that is, it is also a full color (L, A, B) signal, with the chroma (A, B) sub-sampled by a factor of 2× in the fast scan direction only.

The second Scale Module 404 instance (SMS) is similar in operation to the first Scale Module 402, except that the input and output signals SCM 220 and SMS 230 are monochrome (L* channel only). Therefore the description of Scale Module instance SMS 230 will follow from the luminance part of Scale Module instance DSS 226, with the chroma parts omitted.

Figure 6:
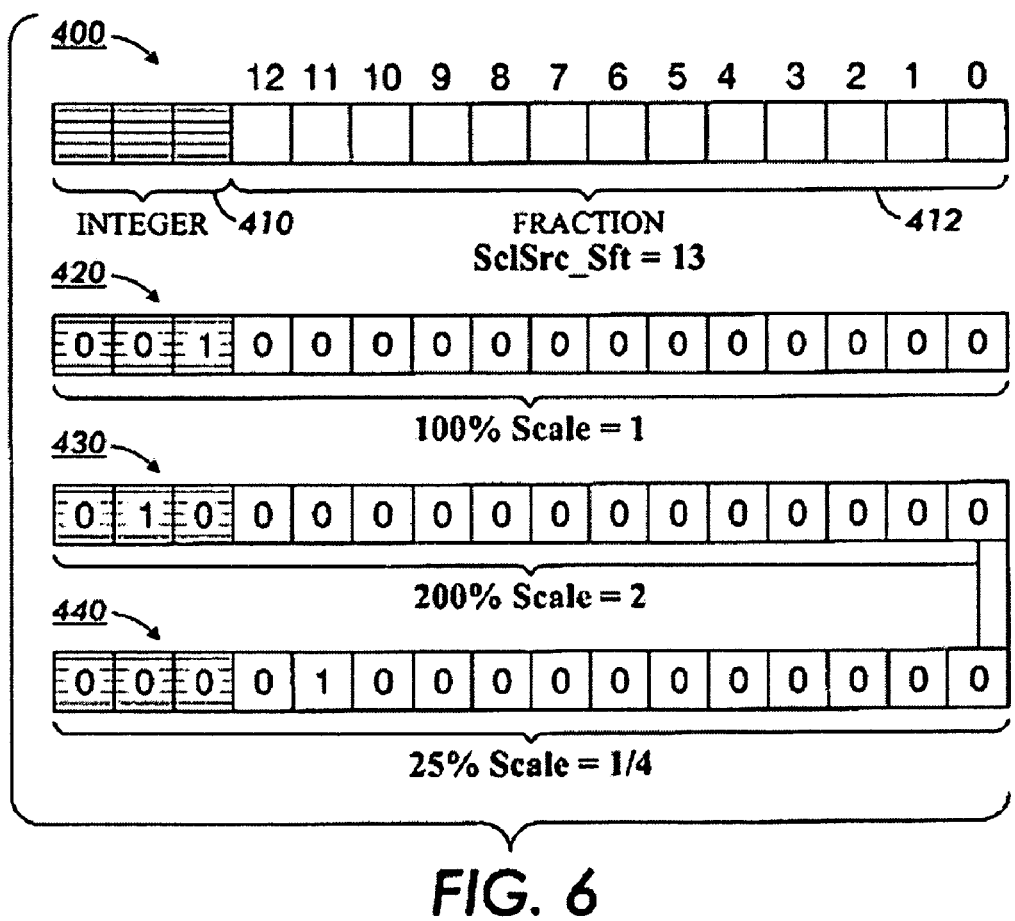
FIG. 6 illustrates amount of scaling in the fast and slow scan direction expressed using a fixed integer and fraction notation.

The amount of scaling in the fast and slow scan direction is expressed using a fixed integer 410 and fraction notation 412 as shown in FIG. 6. The constant SclSrc_Sft 412 defines the number of bits allocated to the fraction part (currently set to be 13 bits). With 16-bit representation, this provides at least 3 bits for the integer part 410 to cover the required 4× reduction range. In addition, the 13-bit fraction ensures that the total accumulated positioning error is smaller than about 1 pixel across the width of a letter-size page.

Using the above representation, the amount of slow and fast scan scaling is pre-defined (and fixed throughout the page) using the 16-bit registers Scale_X and Scale_Y, respectively. Note that in order to scale the input image by the same amount in each direction, both Scale_X and Scale_Y must be loaded with the same appropriate number. FIG. 6 includes several examples 420, 430 and 440 for valid Scale_X and Scale_Y values.

During the algorithm initialization phase, 16-bit variables are initialized as shown in the table 450 of FIG. 7. These variables are convenient to use throughout the operation of the Scale module. Note that unless otherwise noted, all variables use 16-bit words. Some of the variables use the fixed integer/fraction notation shown in FIG. 6.

Figure 8:
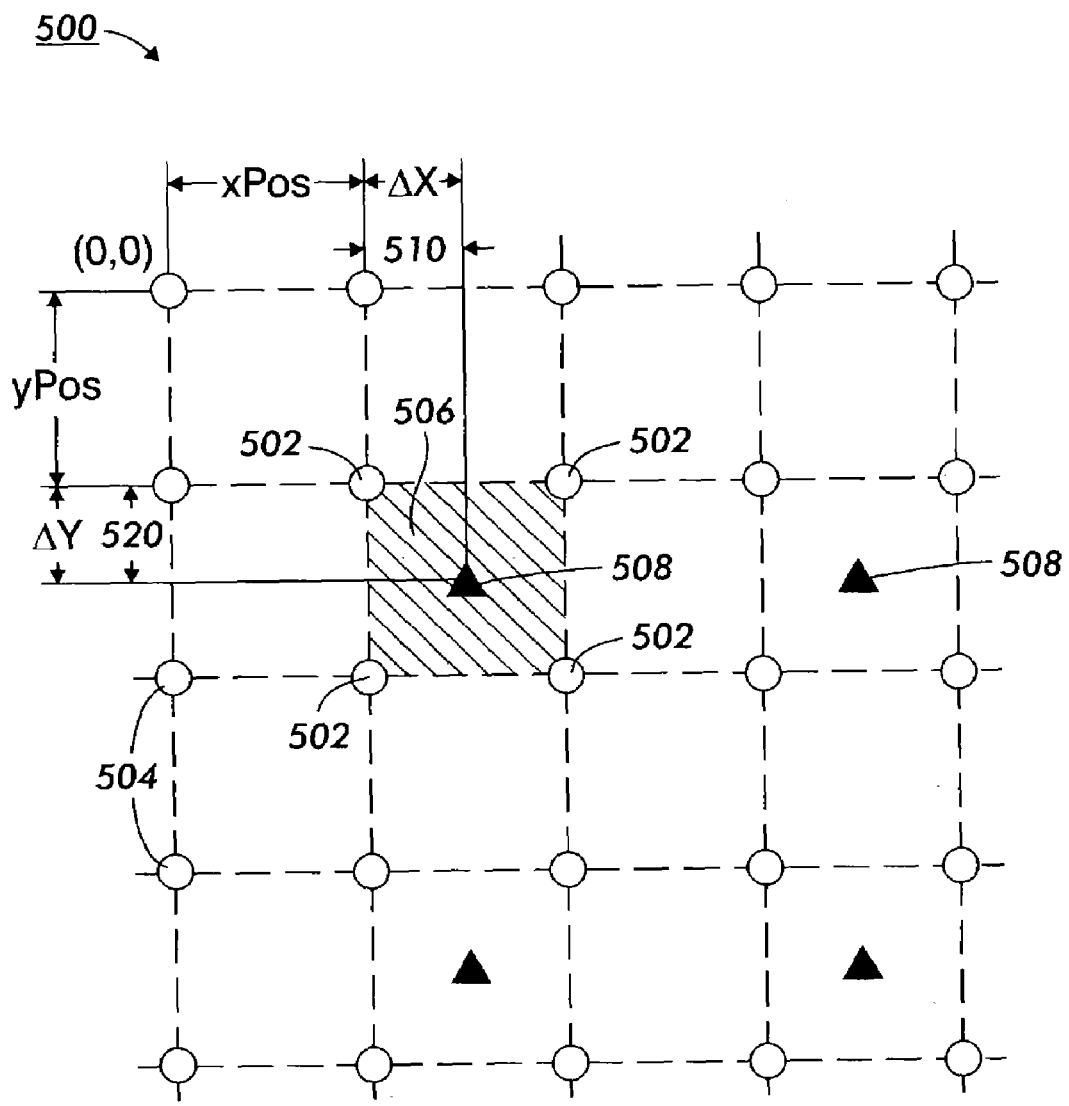
FIG. 8 illustrates the operation of the Scale Module.

The operation of the Scale Module 224 is illustrated in FIG. 8. First, the (X, Y) source step factors StpSrc_X and StpSrc_Y are used to calculate the location of the next output pixel (shown as a black triangle 508 in FIG. 8). The location is then used to identify the four closest source pixels 502 surrounding the target destination pixel 508. A 2D bilinear interpolation algorithm is then used to calculate (interpolate) the value of the destination pixel 508 based on the values of the four neighbors. The process repeats for each destination pixel, using, in general, four new source pixels, until all of the destination pixels are outputted.

It should be noted that in the case of greater than 50% reduction or enlargement, every now and then two or four destination pixels could be located within the same shaded area, such that the same four source pixels are used more than once.

The location of each destination pixel is maintained in two 32 bit registers: yPos and xPos. Each register has a 19 bit integer part and 13 bit (SclSrc_Sft) fractional part. The register values are in source pixel units with the origin at the top left corner of the page. The integer parts of yPos and xPos are the row and column indexes of the source pixel 604 at the top-left corner of the shaded areas in FIG. 8 and 9. The fractional parts of yPos and xPos represent the offset of the destination pixel down and right from the upper-left corner reference pixel. These fractions are used as the interpolation weights.

Figure 9:
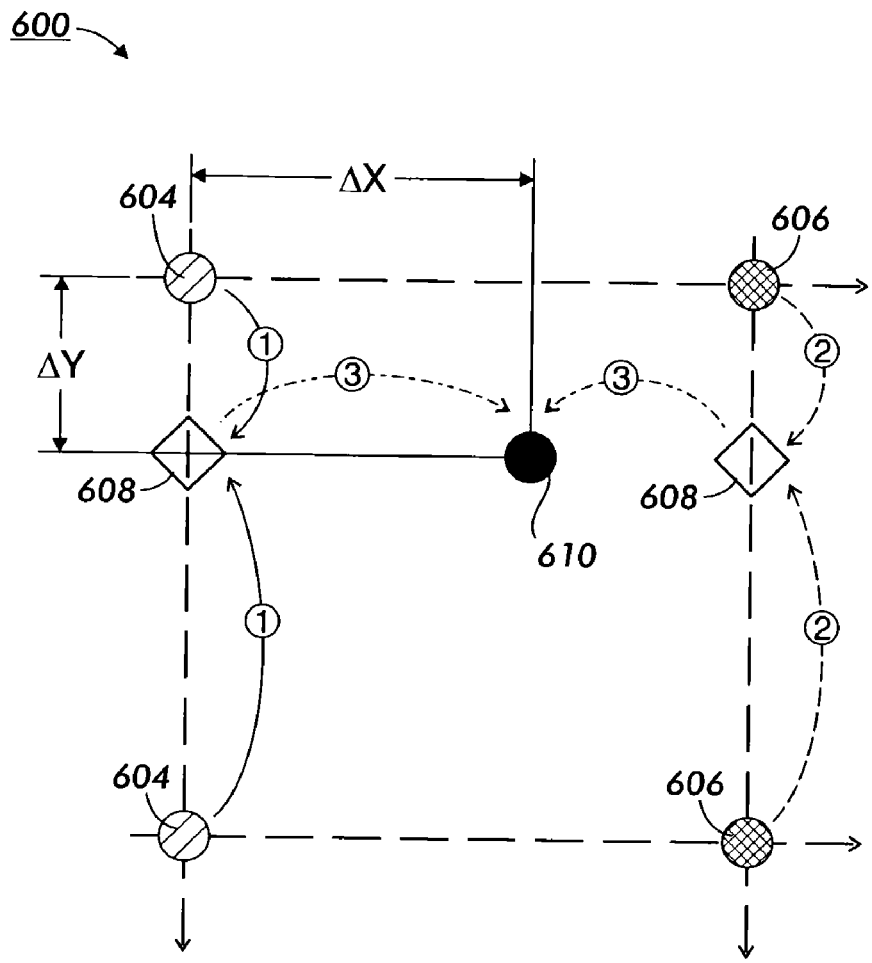
FIG. 9 illustrates the three 1D interpolation steps in the Scale Module.

For each destination pixel, the 2D bilinear interpolation over the shaded area is implemented using a sequence of three 1D linear interpolation steps. Without loss of generality, assume that the vertical (slow-scan) interpolation occurs first. The three interpolation steps will then be composed of two vertical (slow scan) 1D steps, followed by one 1D horizontal (fast scan) step. Referring to FIG. 9, in the first vertical step the two left pixels 604 are vertically interpolated to calculate the value along the destination line. In the second step, the right pixel-pair 606 are vertically interpolated to calculate the subsequent value along the destination line. In the third and final step, the two previous results 608 are then horizontally interpolated to calculate the value at the destination pixel itself. The details of the three 1D interpolation steps are further described below:

The scaling operation starts from the top-left pixel of the source image, which is referenced as the scaling origin with the current source image location registers (xPos, yPos) initialized to (0, 0).

Beginning here, output pixels are generated at each step using the 4 neighborhood source pixels. Stepping in X is accomplished by adding StpSrc_X to xPos. Stepping in Y is accomplished by adding StepSrc_Y to yPos. For raster scan order, xPos is reset to 0 when yPos is incremented. The 4 source pixels surround the interpolation area may be completely different from the previous step or might be completely the same depending of the scaling factors and position on the page.

The integer port of each register is extracted with a right shift of SclSrc_Sft operation. The fractional part of each register is extracted with a mask of ((1<<SclSrc_Sft)−1) operation. Note that both yPos and xPos (to be described below) need to be 32-bit double words to accommodate sufficiently large page dimensions including the full 13-bit fractions. FIG. 9 shows the 4 source pixels that form the (shaded area in FIG. 8) 2D rectangle on the source grid over which the interpolation takes place.

The 2D bilinear interpolation itself is composed of three 1D linear interpolation steps as illustrated in FIG. 9. In the first step, the left pixel-pair is interpolated in the vertical direction using the vertical fraction. The calculation uses the following formula:

$$\text{Left}=\text{pix}_{TL}+\{[(\text{pix}_{BL}-\text{pix}_{TL})*\text{fraction\_}Y]>>\text{StpSrc\_Sft}\}; \quad (2)$$

where ($\text{pix}_{TL}$, $\text{pix}_{BL}$) are the top-left and bottom-left pixels, on the base and subsequent source lines, respectively. Similarly, in the second step the right pixel-pair is next interpolated in the vertical direction using the vertical fraction in accordance with the following formula:

$$\text{Right}=\text{pix}_{TR}+\{[(\text{pix}_{BR}-\text{pix}_{TR})*\text{fraction\_}Y]>>\text{StpSrc\_Sft}\}; \quad (3)$$

where ($\text{pix}_{TR}$, $\text{pix}_{BR}$) are the top-right and bottom-right pixels, on the base and subsequent source lines, respectively. After calculating the interpolated Left and Right values along the output line in equations (2) and (3), the two results can be interpolated in the fast scan direction to generate the final result. The third interpolation phase follows this equation:

$$\text{Value}=\text{Left}+\{[(\text{Right}-\text{Left})*\text{fraction\_}X]>>\text{StpSrc\_Sft}\}; \quad (4)$$

In the case of the luminance channel, the result of equation (4) is the final result that is directly sent to the output. The luminance value is outputted for each destination pixel:

$$\text{L\_out}=\text{Value} ; \quad (5)$$

Logically, the chroma components are computed just as the L, and afterwards, each output pair is averaged to return to X chroma sub-sampled form.

Chroma pixel calculations can be reduced by leveraging the fact that the chroma components are sub-sampled by a factor of 2× in the fast scan direction. Chances are 50/50 there would be no chroma X interpolation required. To take advantage of this, x interpolation needs to be done first.

Turning back once again to FIG. 1, the Gamut Enhance Module (GME) 232 applies 3 independent Tone Reproduction Curves (TRC) to each of the color components of the input image. The implementation is done via three independent and fully programmable 1D lookup tables. The input to the Gamut Enhance Module 232 is the output DSS 226 from the Scaling Module (SCL) 224, representing a scaled and de-screened version of the source image. The output is the gamut-mapped signal GME 232.

Figure 10:
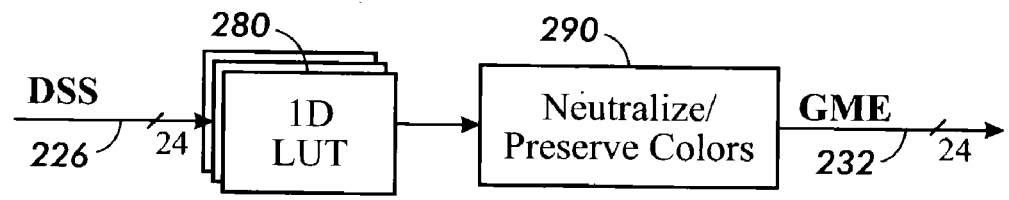
FIG. 10 is a block diagram of the Gamut Enhancement Module GME.
Figure 11:
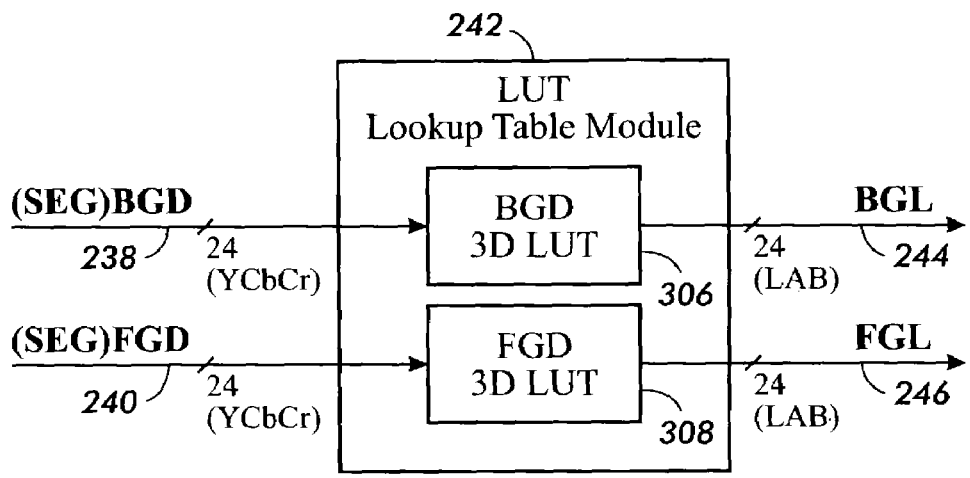
FIG. 11 is a block diagram of the Color Look-up Table LUT.

The block diagram of the Gamut Enhancement Module GME 228 is shown in FIG. 10. The input signal DSS 226 is passed through three independent 8-bit 1D lookup tables, each operating on separate color components. The next block 290 has an option of neutralizing/preserving the color components of each pixel. The color distance of each pixel whose luminance value is equal to 0 or 255 is first computed. If the pixel color distance value is greater than a predetermined threshold amount, then its Luminance value will be set to preset value less than 255, by way of example only, 254. Otherwise, the pixel color components are set to neutral values (a=b=128). The purpose of these adjustments is to ensure that very colored pixel cannot be pure white and that white pixels must be neutral (no chroma).

The encoder pipeline Gamut Enhance Module GME 228 takes as input the full-color de-screened and scaled signal DSS 226 from the Scaling Module SCL 224 and produces-a full-color gamut-enhanced signal GME 232. Both the input signal SCL and the output signal GME are full-color Lab signals that are typically sub-sampled by a factor of 2× in the fast-scan direction only. Note that the number of bits (24) shown under SCL or GME does not necessarily represents the actual number of bits due to the packing and sub-sampling of the (a, b) chroma channels. The actual Lab data is packed as alternating (L, a, L, b) pixel-pairs, at 16 bits per pixel.

Referring once again to FIG. 1, the purpose of the Segment Module 234 is to segment the incoming image into the three MRC layers: Foreground 240, Selector 248, and Background 238 planes. A separate segmentation mode is also provided for synthetic (noise-free) images. The module 234 operates on the gamut-enhanced color image GME 232 from the Gamut Enhance Module 228. The module also uses the screen magnitude estimated signal SCM 220 from the Screen Estimate Module (SEM) 216. The SEG module 234 outputs two full-color images FGD 240 and BGD 238 corresponding to the Foreground and Background planes, and one binary output SEL 248 image for the Selector plane. In addition, the Screen Estimate Module234 can preserve incoming PDL hints 250, if available, for the special case of synthetic (noise free) images. The incoming Rht hints 260 are mapped to CEF hints plane Hnt.

The Lookup Table (LUT) Module 242 converts the color Foreground and Background data from YCC to device-independent Lab color space before compression. The method of conversion is using 3D tetra-headral interpolation with variable power-of-two node spacing. The encode pipeline uses 2 separate instances of the LUT Module 242: In one instance, the Foreground input FGD 240 that is produced by the Segment Module (SEG) 234 is converted from YCC to Lab. In the second instance, the Background input BGD 238 from the Segment Module 234 is converted from YCC to Lab. A third LUT instance is also used in the decode pipeline (not shown), to convert the merged data from Lab to device CMYK (a 3D→4D conversion).

More specifically, the LUT Color Lookup Table Module 242 converts from the internal YCbCr color space into the final CEF Lab representation. The conversion is accomplished using a 3D lookup table. However, since it is applied after segmentation and the data has already been separated into the three MRC planes, each color plane must be independently converted. The binary Selector plane carries no color information and therefore requires no conversion; But the Foreground and Background planes must be independently converted. Although there are two planes to be converted, they are typically sub-sampled by at least 2× in each direction relative to the original scan, so the amount of processing is still less than what would be required to convert the original scan before splitting.

The Color Lookup Table Module LUT. 242 takes as input the source YCbCr color signal 238 and converts it to LAB using the given 3D LUT. Two instances of the Color Lookup Table Module are used: one to convert the source foreground SEG_Fgd to produce Fgd, and the second to convert the background SEG_Bgd into Bgd. Note that the same LUT table is used in both instances.

The 3D LUT supports up to 17 cubed nodes with variable (power of 2) spacing. More information about the variable node spacing aspect is provided later in this document. The nodes of the tables are downloadable. Only one 3D table is resident at any given time. The same table structure is used for either the foreground or background.

The LUT module 242 describes a simple and efficient method of implementing interpolation or extrapolation operation in one or more dimensions. Current techniques use a table for the node values followed by an interpolation stage, and generally require the nodes to be uniformly spaced. In this document, a new method is described that allows the selected node positions in the lookup table to be programmable with arbitrary power-of-two node spacing. The new method requires very little additional computations over the existing techniques, and could provides significantly better interpolation quality for the same number of nodes. The new method is simple, flexible, and invariant with respect to the hardware architecture. The new method has been implemented in software and was demonstrated to show significant improvement in color fidelity for the application of color space conversion (over the traditional fixed-linear node spacing architecture). In the application of SCC (scanner color space conversion), experiments showed the proposed method improved the color interpolation accuracy by a factor of almost 2 over the traditional methods (as measured by the color error metric $\Delta E$).

The need for multi-dimensional interpolation arises in many fields of signal and image processing, where it is required to determine the value of a point in [multi-dimensional] space based on the known values of a set of other points (nodes). In many applications the nodes are conveniently measured on a fixed, uniformly spaced, grid locations. It is well known that the interpolation accuracy of a non-linear space can significantly be increased when the [same number of] nodes are optimized for arbitrary locations that are not necessarily restricted to be on regular grid positions. However, the extra computational complexity that is needed to accommodate the arbitrary node locations typically prohibits the use of such schemes in practical applications.

Therefore, an efficient method is proposed for reducing the additional complexity associated with the arbitrary node locations by restricting the integer [non-normalized] distance between nodes to be a binary power-of-two number. The new method is simple and easy to implement, and requires only the addition of a small lookup table.

The new method is particularly applicable in the area of multi-dimensional interpolation for color space conversion. In the modern age of digital information, color documents are typically scanned in RGB and printed in CMYK. The data, therefore, must be converted from one color space to the other (e.g., from RGB to CMYK) as part of the printing process. It is also well known that most CMYK printing processes are highly non-linear due to the properties of the marking devices and the complex multi-color toner or ink interaction. In the current embodiment, as yet another example, the LUT module 242 is used for converting YCC data to Lab color space. However, it should be emphasized here that the basic technique is general and applicable to many other fields of signal and image processing, and the specific example of color space conversion is only used here to illustrate the method.

One method for dealing with the problem of color space conversion is to store in a table the preferred CMYK or Lab values that should be applied to a particular marking engine in order to best reproduce a given input RGB or YCC value. The content of the table could be determined by trial and error experimentation. If it were possible to construct such a table, it would be a simple matter to look up the desired CMYK or Lab values in real time. However, a table like this is highly non-practical, since there are millions of possible RGB color combinations, and the size of a full table would be rather excessive. For example, the usual representation of 8 bits per color RGB and CMYK, will require four tables (one per each of the CMYK colors) with each table containing $2^{24}$ bytes; this number will increase to $2^{30}$ bytes for a 10-bit RGB input.

The common approach to solving the size problem is to use a coarser 3-D table for the nodes, followed by a finer 3-D interpolation stage. Since the number of nodes (typically 9, 17, or 33, depending on quality) is much smaller than the number of possible colors, the size of the table remains manageable. The table is used for looking up the desired CMYK or Lab values for the nodes nearest to the current RGB or YCC point. The interpolation stage is then used to calculate the (estimated) output CMYK or Lab values based on the CMYK or Lab values of the nearest nodes, under the assumption that the space is approximately piece-wise linear between adjacent nodes. The degree of approximation is, of course, dependent on the number of nodes, their relative positions, and the non-linearity of the color transformation. The case of YCC to Lab follows in a similar manner. For better clarity, only the case of RGB to CMYK will be discussed below.

It should be noted here that several types of interpolation schemes have been proposed in the literature. A natural choice is the well-known multi-linear interpolation scheme, but there are other techniques, such as polyhedral interpolation schemes, which are much more efficient to implement. To illustrate the difference, consider the 3-D case mentioned above. In the tri-linear case, one would first identify the eight nearest nodes (best illustrated as the corners of a cube encompassing the given point of interest in 3D space) and lookup their CMYK values in the table. The CMYK values would then be linearly interpolated (either directly or in a sequence of pairs) to determine an estimated value based of the fractional distance from the given point to each of the nodes. Alternatively, in the tetrahedral interpolation scheme, the cube is further divided into a number of tetrahedrons (the smallest-number-of-nodes object with non-zero volume). The first step is to determine in which of the above tetrahedrons the given point exists. Then only the CMYK values of the four nodes corresponding to the corners of the particular tetrahedron need to be looked up in the table (corresponding to half the bandwidth/number of table look-ups relative to the tri-linear case). Finally, the CMYK values would be linearly interpolated (either directly or in a sequence of pairs) to determine an estimated value based of the fractional distance from the given point to each of the tetrahedron corners. Note that the number of multipliers/adders needed for implementing the final interpolation phase is also much smaller than what is needed for the tri-linear case. Hence the tetrahedral method is much more efficient to implement. It is important to note that the method proposed in this document is applicable to many types of interpolation schemes, including the tri-linear or tetrahedral.

Figure 12:
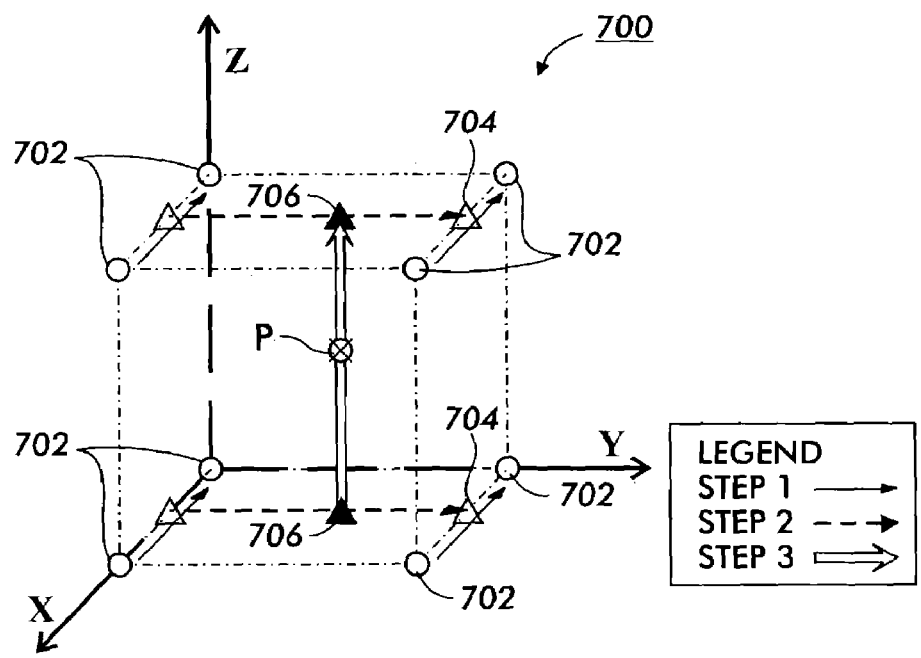
FIG. 12 illustrates the three steps of tri-linear interpolation.

It can be shown that for any number of dimensions, the multi-dimensional interpolation stage by piecewise linear approximation can be reduced to a number of one-dimensional interpolations in a cascading sequence. For example, in the tri-linear case, the interpolation can proceed in pairs along one of the dimensions first (requiring four 1-D linear interpolations) 702 as illustrated in FIG. 12. The resulting four values are then used in pairs along one other dimension 706 (requiring two additional 1-D linear interpolations). Finally, the resulting two values are then interpolated along the third dimension (one more 1-D interpolation) to yield the final result.

Hence the tri-linear interpolation requires a total of seven 1-D linear interpolators, implemented in a three-step sequence. As long as the multi-dimensional interpolation is co-linear, this result will hold true and the order of which dimension to use first will not effect the result.

The generic method described above (table+interpolation) is, in fact, commonly used in practice since the color space non-linearity is often too complicated and cannot easily be described with a simple model. The traditional approach is to restrict the table nodes to be measured on a fixed and uniform grid. While the assumption of equal distance between the nodes certainly simplifies the implementation, it is difficult to justify in practice. Obviously, it would be desirable to allocate more nodes to those areas of the space that are more important visually, or where the degree of non-linearity is higher, such that the piece-wise linear approximation would otherwise fail. The one advantage of the fixed-node scheme is that it is fairly easy to calculate the fractional distance to a base node, and the volume of a cube or particular tetrahedron is constant anywhere in the space.

The complexity of the conventional scheme, on the other hand, would increase significantly if the nodes were allowed to be positioned in a fully arbitrary fashion. The added complexity comes from the fact that the distance between nodes may vary, and a multi-dimensional normalization operation (i.e., division) would be needed to account for the different cube or tetrahedron sizes. It is well known that such divisions are costly to implement.

It is proposed to allow the distance between nodes to be arbitrary, subject to the condition that the integer (non-normalized) distance between nodes is a binary power-of-two number. The motivation for this idea is that a division by an integer power-of-two number can be implemented as a simple shift operation. The additional constraint is not very restrictive since the binary power-of-two system is a logarithmic scale that is convenient for describing both small and large steps at the same time. Furthermore, the method retains full flexibility to choose the node positions to meet the desired reconstruction fidelity; A smaller number of nodes will typically be needed relative to the uniform grid case. In addition, the simple implementation saves a great deal of the associated cost (e.g., silicon gates in ASIC design and computation complexity).

Figure 13:
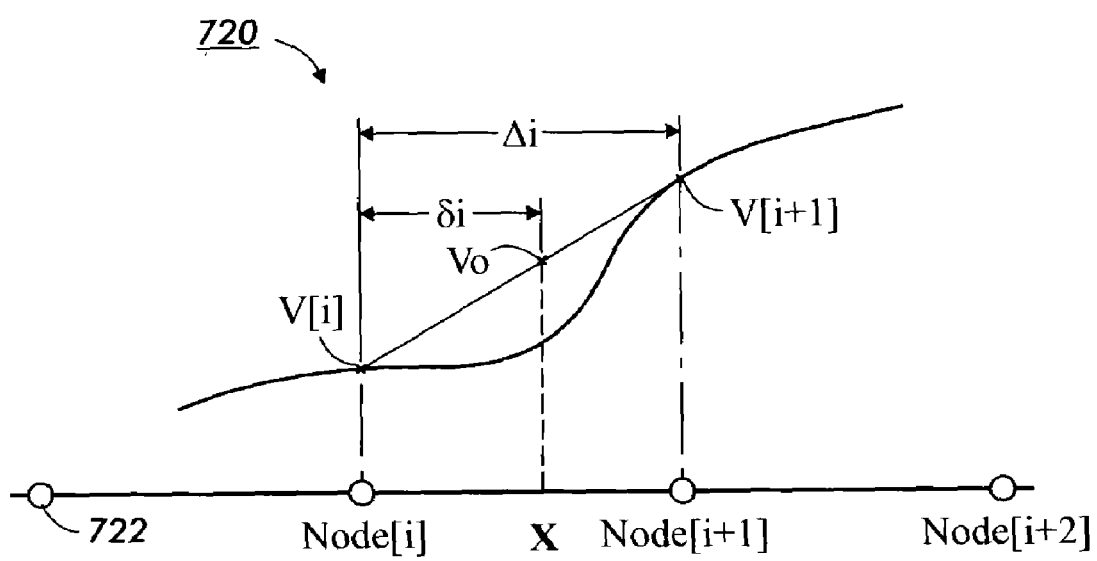
FIG. 13 illustrates the interpolation steps in 1-D.

The lookup table described above contains the non-linear mapping from the input domain to the output domain. For the color space conversion example, the input domain could be RGB (although some applications prefer using a more device-independent intermediate space such as YCbCr or CIELAB) and the output domain is the device (marking engine) CMYK. Since the nonlinear mapping function is either generally unknown or too complicated to implement in a straightforward manner, the content of the LUT is usually determined by experimentation as part of the calibration process. In general, given a LUT, the basic 1-D interpolation step can be expressed as (FIG. 13).

$$V_0 = V[i] + \delta_i/\Delta_i \cdot (V[i+1] - V[i]), \quad (6)$$

$$\delta_i = x - \text{node}[i], \quad (7)$$

$$\Delta_i = \text{node}[i+1] - \text{node}[i], \quad (8)$$

where x is the input point, V[i+1] and V[i] are the values at nodes node[i+1] and node[i], respectively. i and i+1 are the node-indices. $\delta_i$ is the distance from point x to the base node i, $\Delta_i$ is the distance between nodes i and i+1, and $V_0$ is the interpolated value at input point x.

The implementation of Equation (6) has three major operations involved:

1) Base node search: This operation includes comparison logic to search for a base node node[i], such that node[i]<x<node[i+1].
2.) Fraction calculation: This operation calculates the normalized distance fraction $\delta/\Delta_i$ in Equation (6), requiring a general division costly to implement in hardware; and
3.) Interpolation: One multiplication and two additions (subtractions) are needed to calculate the final interpolated value, $V_0$, in Equation (6)

In the conventional case of the simple fixed linear node spacing, the space between any two nodes is a constant, that is, $\Delta_i = \Delta = \text{Const.} \ \forall i$. With constant spacing, the factor $\delta_i/\Delta$ is known and can be pre-calculated in advance as a normalizing factor. However, the equal spacing constraint fails to provide the flexibility to change the distribution of the nodes in the color space for achieving the highest quality as indicated above. On the other hand, fully programmable node spacing retains the maximum flexibility but the implementation is costly and complicated due to the need to calculate arbitrary divisions as discussed above.

To address the flexibility (quality) and, the simplicity (cost) of the previous technique, this document proposes a programmable node architecture with power-of-two node spacing:

$$\Delta_i = \text{node}[i+1] - \text{node}[i] = 2^{k_i}, \ k_i \in N, \quad (9)$$

where N is the set of natural numbers, and k is a different integer constant for each pair of nodes. With the power-of-two number, the general division can be accomplished by a shift operation, which is simple to implement. That is, $$\delta_i/\Delta_i = \delta_i >> k_i. \quad (10)$$

Figure 14:
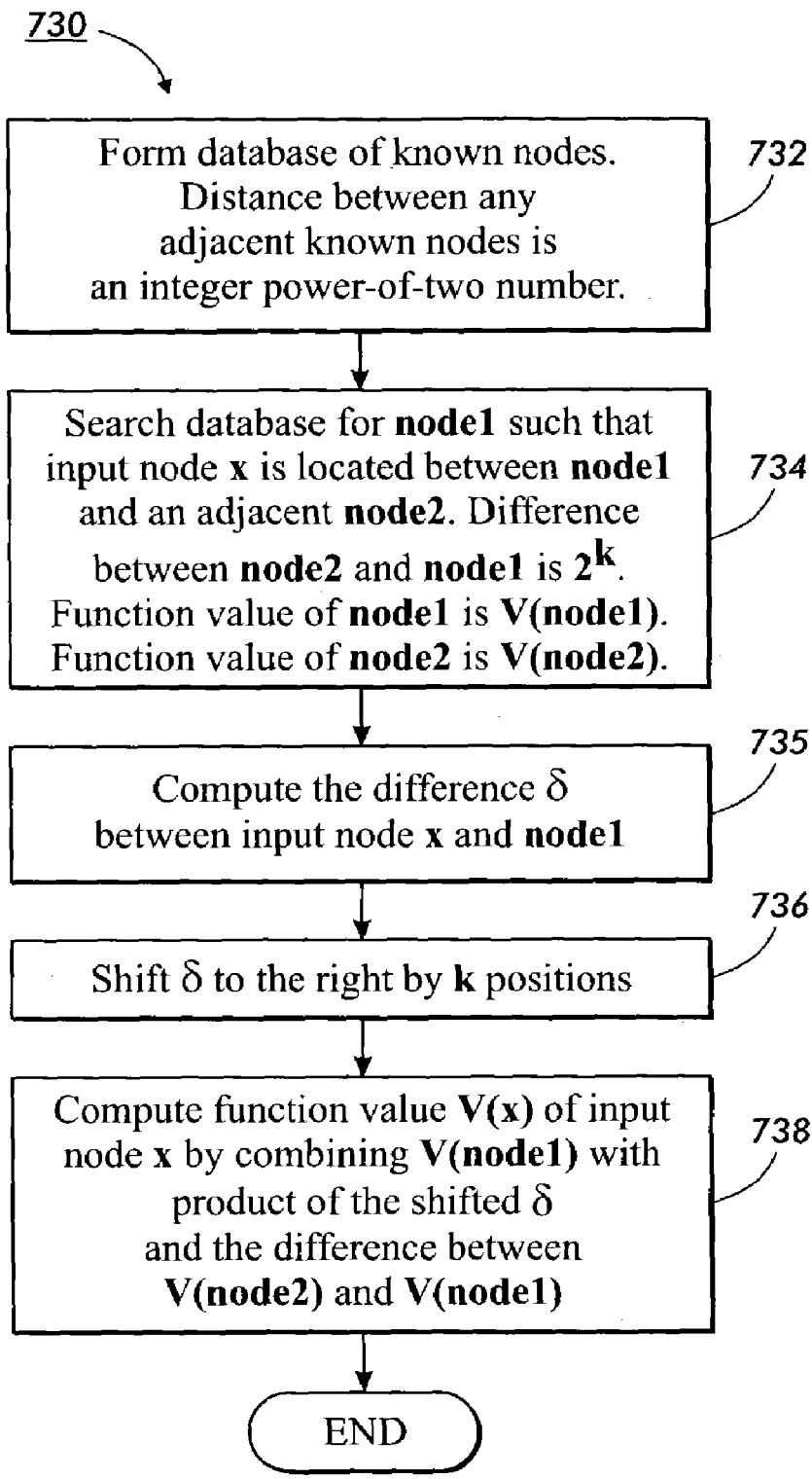
FIG. 14 is a flowchart for computing the Color Look-Up Table LUT.

FIG. 14 is a flowchart of an embodiment 730 of the process for the Color Look-Up Table. A database of the known nodes is formed. The known nodes are chosen such that the distance between any adjacent known nodes is an integer power-of-two number (block 732). For a given input node x, the database is searched for a base node node1 such that the input node x is located between node1 and an adjacent node2 (block 734). The difference between node2 and node1 is $2^k$ The function values of node1 and node2 are V(node1) and V(node2), respectively (stored in the database). Node1 is called a base node because the interpolation will start from the function value V(node1). The difference $\delta$ between input node x and node1 is computed (block 735). The value $\delta$ is logically shifted to the right by k positions, k being the logarithm in base 2 of the distance between the base node node1 and the second node node2 (block 736). The function value V(x) is computed by combining V(node1) with the product obtained by multiplying the shifted $\delta$ with the difference between V(node2) and V(node1) (block 738).

The selection of the base node is generally dependent on the origin of the input color space. For applications where the input color space has an origin at 0 (e.g., RGB color space with R, G, B ranging from 0 and 255), the base node is usually chosen to be less positive than the input node. In this case, V(node2)−V(node1) is positive. For applications where the origin of the input color space is not at 0, but somewhere in the middle range (e.g., CIE-Lab space or YCbCr color space with (a,b) or ($C_b$, $c_r$) ranging from −128 to +127), (see FIG. 18, for example), the base node is usually chosen to be less positive than the input node x if the input node x is greater than the origin, and more positive than the input node x if the input node x is smaller than the origin. In this case, V(node2)−V(node1) is positive for input node x greater than the origin, and negative for input node x smaller than the origin.

In most applications, the k values, also called inter-node exponents, may be computed in advance and stored in the database. In some applications, the k values may be computed in real time, when needed.

The following example shows how the database may be formed for an RGB to CMYK color space conversion application. First, a table of arbitrary RGB nodes and their corresponding preferred CMYK values is generated. The preferred CMYK values are the ones that would best reproduce the corresponding RGB values, when applied to a particular marking engine. The content of the table can be determined by trial and error experimentation, using high-precision instruments to measure actual color values of certain points on the output of the marking engine. After the table is generated, an interpolation scheme such as the tetrahedral method (discussed previously) can be used on the content of the table to obtain the CMYK values for a set of selected RBG points. These RGB points are selected such that the spacing between any two adjacent selected RGB points is an integer power-of-two number. The database is then formed by using only these selected RGB nodes and their corresponding CMYK values.

Figure 15:
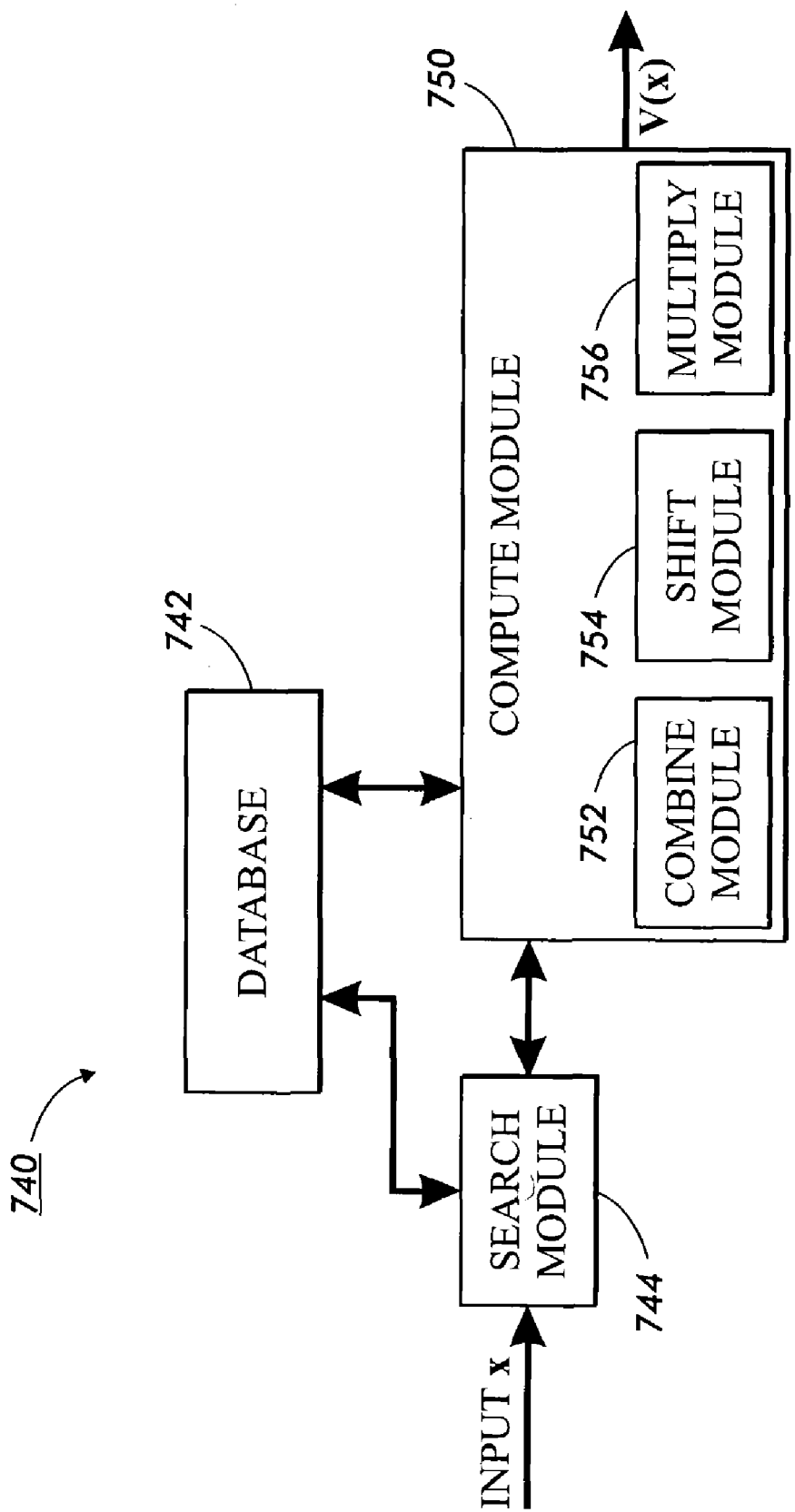
FIG. 15 is a block diagram for use with the flowchart shown in FIG. 14.

FIG. 15 is a block diagram of an embodiment 740 of the system for the Color Look-Up Table. System 740 comprises a database 742, a search module 744, and a compute module 750. The compute module 750 includes a combine module 752, a shift module 754, and a multiply module 756.

The database 742 stores a list of known nodes, corresponding known node function values, and inter-node exponents. The known nodes are located such that a distance between any two adjacent known nodes is an integer power-of-two number. Each of the known nodes that are not located at boundaries of the list is associated with two inter-node exponents which represent the logarithms in base 2 of respective distances between the corresponding known node with respective adjacent known nodes.

The search module 744 searches from the database for a base node such that the input node is located between the base node and a second node adjacent to the base node. The direction of search, whether above or below the input node, is programmable based on the location of the origin.

The combine module 752 computes the difference δ between the input node and the base node, and the difference ΔV between the second node function value and the base node function value. The shift module 754 shifts δ to the right by k positions, k being the inter-node exponent associated with the base node with respect to the second node. The multiply module 756 multiplies the shifted δ with the difference ΔV and outputs a product value. The combine module 752 combines the base node function value with the product value to form the function value V(x) of the input node.

The compute module 750 may communicate with the database, as shown in FIG. 15. This is the case where the search module 744 does not pass to the compute module 750 all data resulting from the search. For example, the search module 744 may pass only the node index of the base node. The compute module would use this node index to look up other data in the database 742. In another embodiment where the search module passes all needed data to the compute module 750, the compute module 750 does not need to access the database 742.

In a first embodiment, the database 742 includes a single lookup table that includes the node indices corresponding to the known nodes, the known nodes, the corresponding node function values, and the inter-node exponents.

In a second embodiment, the inter-node exponents are not stored in a lookup table, and are computed as needed.

In a third embodiment, the database 742 includes a main lookup table and an extra lookup table. The main lookup table includes the node indices corresponding to the known nodes, and the corresponding node function values. The extra lookup table includes the node indices corresponding to the known nodes, the known nodes, and the inter-node exponents.

With the new architecture, we can construct a LUT which contains the node index, node value, inter-node exponent and output value. The exponent is the base 2 logarithm of the distance between any adjacent two nodes. That is, $$\text{exponent}[i] = \log_2(\text{node}[i+1] - \text{node}[i]) \tag{11}$$

An example is illustrated in FIG. 16.

For a given input x, the interpolated output $V_0$ can be computed. Note, the bisection algorithm is just one of many possible search algorithms that could be used as a searching engine to find the base node. Theoretically, the proposed architecture can map any bit-precision input to any bit-precision output. Since the input and output are tabulated in the LUT, any bit-precision representation can be accommodated in the table. In practice, the choice of bit-precision depends on the number of bits used for representing the signal (colors) and the cost to implement. The proposed architecture does not place any restrictions on the choice of bit-precision. FIG. 17 gives an example of an LUT that takes 10-bit input instead of the 8-bit input shown in FIG. 16.

Figure 18:
FIG. 18 shows a table having example values at 128 for the LUT.

FIG. 16 gives an example of color space conversion in which denser samples are needed near the origin. Note that the node spacing is closer for the nodes near origin than those far from the origin. This type of node distribution has been found to be desirable when working with the RGB input color space (where a square root rule is often used in practice). Occasionally, the system needs to support different input color spaces, for example, CIE L*a*b*, Fax L*a*b*, etc. For CIE L*a*b*, the a* and b* channels have origin at 128. Fax L*a*b*, on the other hand, assumes the a* channel has origin at 128 but the b* channel has origin at 96. The proposed architecture is very flexible and can easily support the various origin differences and needs without having to change the implementation. Hence the architecture is implementation invariant and generic. Using different LUTs will serve the needs of different requirements. FIGS. 18 and 19 show examples for origins at 128 and 96, respectively, and illustrate the way to accommodate the b* channel for CIE L*a*b* and Fax L*a*b* by means of reloading the LUT table.

The proposed method was tested in a Scanner Color Conversion application in which the scanner RGB input is converted to CIE L*a*b* color output. The standard ITU-8 chart has been used as a calibration target. The conversion accuracy was measured in terms of the color difference signal ΔE between the CIE Lab values obtained by fixed linear node spacing, power-of-two node spacing and a reference implementation using non-linear node spacing with twice as many nodes. In both of the two first methods, the fixed linear and proposed power-of-two techniques, 17×17×17 LUTs and tetrahedral interpolation were used, under the same number of nodes. For the much denser interpolation, which serves as the benchmark, a 32×32×32

LUT with nonlinear cube-root node spacing was used. The node locations for the first two methods are shown below:

| Linear: | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|
| Power-of-two: | 0 | 4 | 8 | 16 | 32 | 48 | 64 | 80 | 96 | 112 | 128 | 144 | 160 | 176 | 192 | 224 | 255 |

The average ΔE obtained for linear node spacing and for power-of-two node spacing were 2.67 and 1.53, respectively. As we can see from this experiment, the new power-of-two architecture provides much more accurate conversion than the fixed linear node spacing architecture, and with a small amount of extra computations.

In conclusion, the proposed power-of-two node spacing architecture provides a good tradeoff between the flexibility to and complexity. Unlike the fixed linear node spacing architecture, it retains the flexibility to choose nonlinear node spacing to better meet the image quality requirements, and on the other hand, unlike the fully programmable node architecture, it is simple and cost effective to implement. In the application of SCC (scanner color space conversion) used as part of this application, it has been demonstrated that the proposed method improves the color fidelity by almost factor of 2 over the traditional method.

Turning once again to FIG. 1, the Statistics Module (STS) 210 is responsible for collecting essential statistics about the image content for the purpose of applying various image enhancement operations such as page background removal and automatic neutral detection to determine if the page is gray or colored. This Statistics Module 210 uses the blurred signal BLR 208 from the De-Screen Module 206 in order to eliminate some of the scanner noise. The output is a special 3D color histogram array.

The Statistics Module (STS) 210 is part of the larger chain of image cleanup and further enhancements. The overall chain is shown in FIG. 18. The Statistics Module (STS) 210 forms the first stage of the chain by gathering information about the pixel values and colors. In the second step of the image enhancement chain, the data collected by the Statistics Module (STS) 210 is analyzed for determining the key image enhancement parameters. Finally, the values of these parameters are passed to the Image Enhancement Unit to perform the actual image enhancements.

Figure 20:
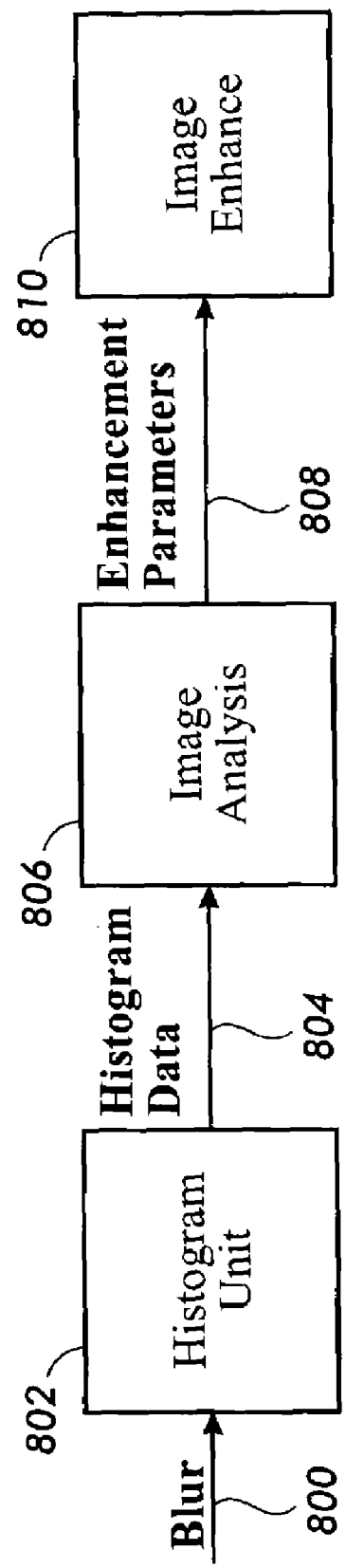
FIG. 20 is a block diagram of the statistics module.

The partitioning among the three functions of FIG. 20 is especially useful for illustrating the different role of each part. The Statistics collection phase 802 is typically done at the image capture time (front-end), while pixel and color values are available. After the input image is segmented and compressed by the encode pipeline, the pixel data is no longer directly available without [the time consuming operations of] decompressing and merging the various planes). The Image Analysis 806 phase relies on the statistics data to extract a set of enhancement parameters 808.

One example for the operation of the image enhancement chain is Background Removal. A simple black and white text document is expected to reproduce as black characters on an otherwise white background. However, a scanned image of such a page will hardly ever have a perfectly clean (that is, a luminance value of 100) background. In general, the pixel values of the background areas will be noisy, with actual luminance values that depend on the reflectance of the paper media. Yet the desire is to produce a clean background for a wide range of media types, from low-quality newspaper to high reflectance photographic paper.

The standard approach to Background Removal is to determine the "white point" value of the page, and use this value to modify a tag in the compressed image header file. The actual background removal occurs at the back-end after decompression and merger, where the pixel values are modified through the tone reproduction (TRC) lookup table.

It should be noted that in the above Background Removal example, the statistics data is used for extracting one parameter identified as the white point. More sophisticated Background Removal algorithms may also extract additional information regarding the black point, the amount of scanner noise, and the background color. The important message here is that the statistics data is used in the analysis phase to extract a few enhancement parameters that control the degree of enhancement at reconstruction time.

Additional image enhancement operations such as automatic real-time image enhancement (AIE-like) or region segmentation, etc. could be applied to further enhance the CEF image. These include automatic detection and enhancement of text or image data. The information collected by the Statistics Module (STS) 210 could be used by such operations.

The Statistics Module (STS) 210 cumulates statistics on a blurred version 208 of the image to reduce noise. The Statistics Module (STS) 210 takes as input a full-color signal in the Luminance/Chrominance space (such as Lab, YCC, etc. The input signal is normally assumed to be sub-sampled by a factor of 2 in the fast scan direction in the Scan Color Conversion (SCC) Module. However, the Statistics Module (STS) 210 algorithm is generic and can process sub-sampled or non sub-sampled data equally well.

For the common applications such as scan, print, and copy, a full, joint 3-dimensional histogram is found to be unnecessary. Instead, a 1-D histogram of the luminance channel accompanied by the dependent chrominance sums was determined to give adequate results. Therefore, the output of the Statistics Module (STS) 210 include the following data arrays:

1) Luminance histogram (an array of 256 unsigned entries, 32-bit each)
2) Two Dependent Chroma sums (arrays of 256 signed entries, 32-bit each)
3) Four 32-bit Luminance and Color strength registers (to be described below)

A memory-constrained implementation may be required to reduce the number of histogram bins. A 128-bin implementation would remove the center 128 bins leaving 64 bins near zero and 64 bins near 255 so that both the black and white point of the image can be determined. The number of bins is programmable depending on the application and accuracy needs.

For the case of a nearly constant image, the scanner resolution and largest media size determine the maximum sum size:

$$\text{Max-Chroma-Sum} = 255 * width * height * resolution^2$$

It is desirable not to exceed 32 bit wide counter/registers. For an image size of 11×17 inches at 600 dpi, Max-Chroma-Sum would be 34 bits wide so some subsampling is allowed to maintain the max sum $<2^{32}$. Sufficient, uniform, power of 2 subsampling should be done in x and y so that Max-Chroma-Sum fits into 32 bits.

The operation of the Statistics Module (STS) 210 is as following: The 8-bit unsigned incoming luminance input signal L is used as an address to point to a specific location in the data arrays. The same address is used for all three arrays.

For the histogram component of the luminance L, the content of the array at the current luminance value is incremented by one. The histogram is formed by the distribution of the luminance values as given by the counts of pixels having the same luminance values.

The STS unit 210 includes the two chroma channels (A, B), the actual chroma values are added to the previous content at the given luminance address. The color means could later be calculated by normalizing the added values by the luminance counts. However, since the chroma components are signed numbers, the chroma arrays must use larger word sizes to accommodate the 8-bit signed range.

This includes the two color strength measures that are used for determining the neutrality of the page and two luminance strength measures for the page binary detection. For each incoming pixel, the manhattan distance of the pixel from the neutral axis (A=B=0) is first calculated as:

Color distance=abs($A$–128)+abs($B$–128)

Where the bias of 128 is due to the sign bias of the chroma components. The color distance is next compared with two 16-bit thresholds: the weak color threshold WeakClrClrThr and the strong color threshold StrongClrClrThr; The number of pixels that have a color distance larger or equal than the weak color threshold is counted separately of the number of pixels having a color distance larger or equal than the strong color threshold. The similar approach is done for binary page detection. For an 11×17 page, the two counts are provided as two 32-bit registers.

An option exists to further sub-sample the incoming chroma channels, or even the luminance channel, in order to reduce the array sizes. A small amount of sub-sampling would probably be acceptable, but would not significantly reduce the array sizes. Higher sub-sampling amounts may require a feasibility study, especially for the page neutrality where small strong-colored features may be lost due to the extended subsampling.

The Compress Module (CMP) 252 operates on the four CEF planes independently. The module uses lossy JPEG compression method to compress the color Foreground 256 and Background 254 planes; and it uses lossless ITU Group 4 compression with the binary selector 258 and Hint 262 planes.

Finally, the compressed MRC planes from the Compress Module (CMP) 252 and the collected histogram data from the Statistics Module (STS) 212 are wrapped together in the DXW Wrapper Module 214 to form the TIFF or PDF MRC CEF output 270.

While certain exemplary embodiments have been described in detail and shown in the accompanying drawings, those of ordinary skill in the art will recognize that the invention is not limited to the embodiments described and that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and spirit of the invention as defined by the appended claims.

What is claimed is:

1. A method for computing the function value of an input node based on function values of known nodes within a mixed raster content, where mixed input images, some or all of which may be sub-sampled, are merged according to a given rule, to form an output image, the method comprising the operations for each input image individually, and comprising the steps of:
   (a) forming a database of known nodes and corresponding known node function values, the known nodes being non-uniformly located such that a distance between any two adjacent known nodes is an integer power-of-two number;
   (b) searching from the database of known nodes for a first node such that the input node is located between the first node and a second node adjacent to the first node, the first and second nodes having a first node function value and a second node function value, respectively;
   (c) computing the difference δ between the input node and the first node;
   (d) shifting δ to the right by k positions, k being the logarithm in base 2 of the distance between the first node and the second node; and
   (e) computing the function value of the input node by combining the first node function value with the product of the shifted δ and the difference between the second node function value and the first node function value.

2. The method of claim 1 wherein operation (a) comprises the operations of:
   generating a first lookup table and a second lookup table, the first lookup table including node indices corresponding to the known nodes, and corresponding node function values, the second lookup table including node indices corresponding to the known nodes, the known nodes, and inter-node exponents, each of the known nodes not located at boundaries of the second lookup table being associated with two inter-node exponents which represent the logarithms in base 2 of respective distances between the corresponding known node with respective adjacent known nodes; and
   loading the first and second lookup tables into the database.

3. The method of claim 2 wherein the known nodes correspond to a dimension of a first multi-dimensional space, and the node function values in the first lookup table correspond to a dimension of a second multi-dimensional space.

4. The method of claim 3 wherein the first multi-dimensional space has an origin, and wherein, in operation (b), the direction of search for the first node with respect to the input node depends on the location of the origin.

5. The method of claim 1 wherein, in operation (b), the direction of search for the first node with respect to the input node is programmable.

6. The method of claim 1 wherein operation (a), comprises the operations of:
   generating a lookup table, the lookup table including node indices corresponding to the known nodes, the known nodes, corresponding node function values, and inter-node exponents, each of the known nodes not located at boundaries of the lookup table being associated with two inter-node exponents which represent the logarithms in base 2 of respective distances between the corresponding known node with respective adjacent known nodes; and
   loading the lookup table into the database.

7. The method of claim 1 wherein operation (a) comprises the operation of programming locations of the known nodes.

8. The method of claim 1 wherein operation (d) comprises the operation of computing the logarithm in base 2 of the distance between the first node and the second node to obtain k.

9. A system for computing the function value of an input node based on function values of known nodes, the system comprising:
- a database storing a list of known nodes, corresponding known node function values, and inter-node exponents, the known nodes being non-uniformly located such that a distance between any two adjacent known nodes is an integer power-of-two number, each of the known nodes not located at boundaries of the list being associated with two inter-node exponents which represent the logarithms in base 2 of respective distances between the corresponding known node with respective adjacent known nodes;
- a search module searching from the database for a first node such that the input node is located between the first node and a second node adjacent to the first node, the first and second nodes having a first node function value and a second node function value, respectively; and
- a compute module, in communication with the search module, comprising:
- a combine module computing the difference $\delta$ between the input node and the first node, and the difference $\Delta V$ between the second node function value and the first node function value;
- a shift module shifting $\delta$ to the right by k positions, k being the inter-node exponent associated with the first node with respect to the second node; and
- a multiply module multiplying the shifted $\delta$ with the difference $\Delta V$ and outputting a product value;
- wherein the combine module combines the first node function value with the product value to form the function value of the input node.

10. The system of claim 9 wherein the database includes a first and a second lookup tables, the first lookup table including node indices corresponding to the known nodes, and the corresponding known node function values, the second lookup table including the node indices, the known nodes, and the inter-node exponents.

11. The system of claim 9 wherein the known nodes correspond to a dimension of a first multi-dimensional space and the corresponding known node function values correspond to a dimension of a second multi-dimensional space.

12. The system of claim 11 wherein the first multi-dimensional space has an origin, and wherein the search module searches for the first node in a direction, with respect to the input node, that depends on the location of the origin.

13. The system of claim 9 wherein the search module searches for the first node in a programmable direction with respect to the input node.

14. The system of claim 9 wherein the database comprises a lookup table, the lookup table including node indices corresponding to the known nodes, the known nodes, the corresponding node function values, and the inter-node exponents.

15. The system of claim 9 wherein locations of the known nodes in the database are programmable.

16. The system of claim 9 wherein the system is implemented on an integrated circuit.

* * * * *